US007359914B2

(12) United States Patent
Kintzley et al.

(10) Patent No.: US 7,359,914 B2
(45) Date of Patent: Apr. 15, 2008

(54) REFERENCE MANAGER

(75) Inventors: Randy Allan Kintzley, Novato, CA (US); Stefanos Michail Makris, Novato, CA (US); Thomas Allen Stoeckel, Jr., Clovis, CA (US)

(73) Assignee: Autodesk, Inc., San Rafael, CA (US)

( * ) Notice: Subject to any disclaimer, the term of this patent is extended or adjusted under 35 U.S.C. 154(b) by 603 days.

(21) Appl. No.: 10/287,956

(22) Filed: Nov. 5, 2002

(65) Prior Publication Data

US 2004/0088305 A1    May 6, 2004

(51) Int. Cl.
G06F 7/06    (2006.01)
(52) U.S. Cl. .................................. 707/103 R
(58) Field of Classification Search ............... 707/103; 709/217, 218, 219
See application file for complete search history.

(56) References Cited

U.S. PATENT DOCUMENTS

| 5,519,866 | A | * | 5/1996 | Lawrence et al. | 717/162 |
| 5,838,319 | A | * | 11/1998 | Guzak et al. | 715/854 |
| 5,864,866 | A | * | 1/1999 | Henckel et al. | 707/103 R |
| 6,067,641 | A | * | 5/2000 | McInerney et al. | 714/38 |
| 6,343,287 | B1 | * | 1/2002 | Kumar et al. | 707/4 |
| 2002/0063734 | A1 | * | 5/2002 | Khalfay et al. | 345/744 |

OTHER PUBLICATIONS

Keller, A.; Blumenthal, U.; Kar, G., "Classification and computation of dependencies for distributed management" Computers and Communications, 2000. Proceedings. ISCC 2000. Fifth IEEE Symposium on Jul. 3-6, 2000 pp. 78-83.*
http://www.markcad.com/autocad/tutorials/xref_attach,htm accessed and printedon Sep. 20, 2005, last modified by Mark Middlebrook on Sep. 15, 2000 5 pages.*
Oliver Schade, "Microsoft's Evolution in Technology: Windows 3.1", http://internet.ls-la.net/ms-evolution/windows-3.1/, accessed and printed Nov. 28, 2006, Windows 3.1 released 1992, 10 pages.*
Magnus Larsson et al., "Configureation mangagement for compo-nent-based systems", Proc. Int. Conf. on Software Engineering (ICSE), 2001, 5 pages.*

* cited by examiner

*Primary Examiner*—Paul Rodriguez
*Assistant Examiner*—Luke Osborne
(74) *Attorney, Agent, or Firm*—Gates & Cooper LLP

(57) ABSTRACT

A Reference Manager manages complex file relationships between host files and externally referenced files, such as drawings, images, standards, fonts, shapes, plot styles and plot configurations. The Reference Manager provides a number of different functions, including an improved graphical user interface, as well as improved methods for managing complex file relationships between host files and externally referenced files.

36 Claims, 7 Drawing Sheets

REFERENCE MANAGER

BACKGROUND OF THE INVENTION

1. Field of the Invention

The present invention relates generally to a reference manager for managing complex file relationships between host files and externally referenced files.

2. Description of the Related Art

In some application programs, such as the AUTOCAD® product sold by Autodesk, Inc., the assignee of the present invention, an external reference (xref) links a referenced drawing to a host drawing. When a user inserts the referenced drawing as an xref in the host drawing, the xref is updated when the referenced drawing changes. The host drawing containing xrefs always reflects the most current editing in each referenced drawing.

On the other hand, when a user inserts the referenced drawing as a block in the host drawing, the block definition and all of the associate geometry are stored in the host drawing. However, the block is not updated if the referenced drawing changes.

Like a block reference, an xref is displayed in the host drawing as single object. However, an xref does not significantly increase the file size of the host drawing and cannot be exploded.

Xrefs attached to host drawings are designed to help the user build drawings using other drawings. For example, by attaching drawings as xrefs, as opposed to inserting the drawing as blocks, the user can display changes to the externally referenced drawing in the host drawing each time it is opened, and the host drawing always reflects the latest revisions made to the referenced drawings.

Xrefs can be nested within other xrefs. The user can attach as many xrefs as desired, and each can have a different position, scale, and rotation within the host drawing. The user can also control the dependent layers and linetype properties that are defined in that xref.

Notwithstanding the functionality described above, there remains a need in the art for better ways of managing referenced drawings. The present invention satisfies those needs.

SUMMARY OF THE INVENTION

A Reference Manager manages complex file relationships between host files and externally referenced files, such as drawings, images, standards, fonts, shapes, plot styles and plot configurations. The Reference Manager provides a number of different functions, including an improved graphical user interface, as well as improved methods for managing complex file relationships between host files and externally referenced files.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention discloses a Reference Manager that manages complex file relationships between host files and externally referenced files. The functions performed by the Reference Manager include the following:

Displaying detailed information about all externally referenced files in a host file.

Displaying the status of each externally referenced file (for example, whether the externally referenced file resolves properly or is not found), which can be sorted to quickly group problems for easy manipulation.

Automatically attempting to find and open each externally referenced file, wherein the externally referenced file is marked as "Resolved" if it is found and opened; otherwise, it is marked as "Not Found."

Selecting multiple externally referenced files and correcting their paths in a single operation, although path changes are queued up and written back to the files only when the changes are applied.

Permitting all reference relationships and dependencies to be updated automatically, and on a global basis, rather than on a file-by-file basis.

Producing a network-wide report on all the paths among all externally referenced files, regardless of whether they are drawings, images, standards, fonts, shapes, plot styles, or plot configurations, including multiple files or entire directories.

These and other features are described in more detail below.

Hardware Environment

Figure 1:
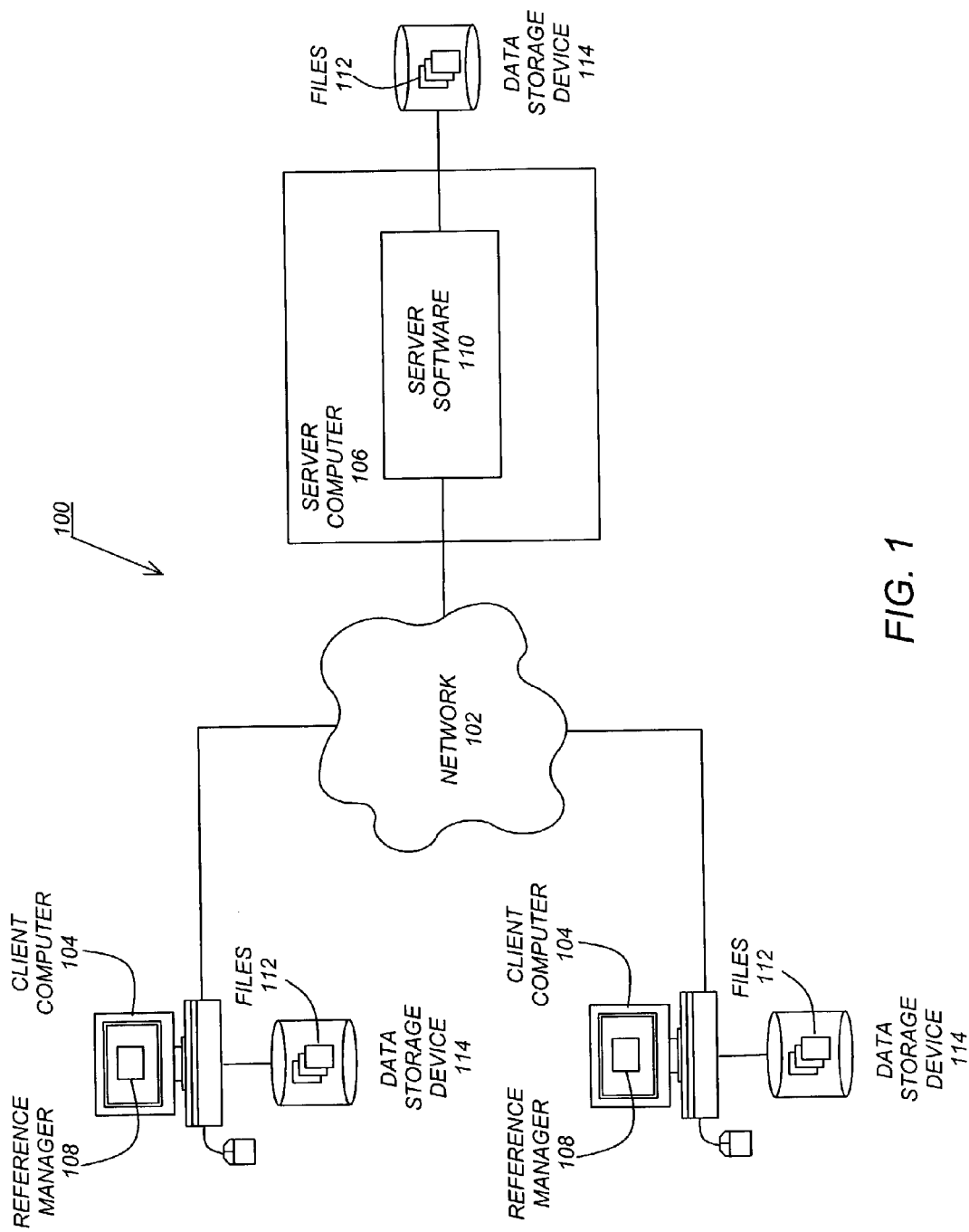
FIG. 1 schematically illustrates a hardware and software environment in accordance with a preferred embodiment of the present invention.

FIG. 1 schematically illustrates a hardware and software environment in accordance with a preferred embodiment of the present invention, and more particularly, illustrates a typical distributed computer system 100 using a network 102 to connect client computers 104 to server computers 106. A typical combination of resources may include a network 102 comprising the Internet, an Intranet, local area networks (LANs), or the like, client computers 104 that are personal computers or workstations, and server computers 106 that are personal computers, workstations, minicomputers, or mainframes.

Each of the client computers 104 may execute client software, known as a Reference Manager 108, and communicate with other client computers 104, as well as server computers 106 executing server software 110. In the preferred embodiment, the Reference Manager 108 manage the relationships between files 112 that may reside on data storage devices 114 of a local client computer 104, a remote client computer 104 or the server computer 106. However, those skilled in the art will recognize that the present invention may be used in any environment and with any application.

Generally, these components 108-112 all comprise logic and/or data that is embodied in or retrievable from a device, medium, signal, or carrier, e.g., a data storage device, a data communications device, a remote computer or device coupled to the computer via a network or via another data communications device, etc. Moreover, the logic and/or data of the Reference Manager 108, when read, executed, and/or interpreted, results in the steps for implementing and/or using the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Reference Manager

Figure 2A:
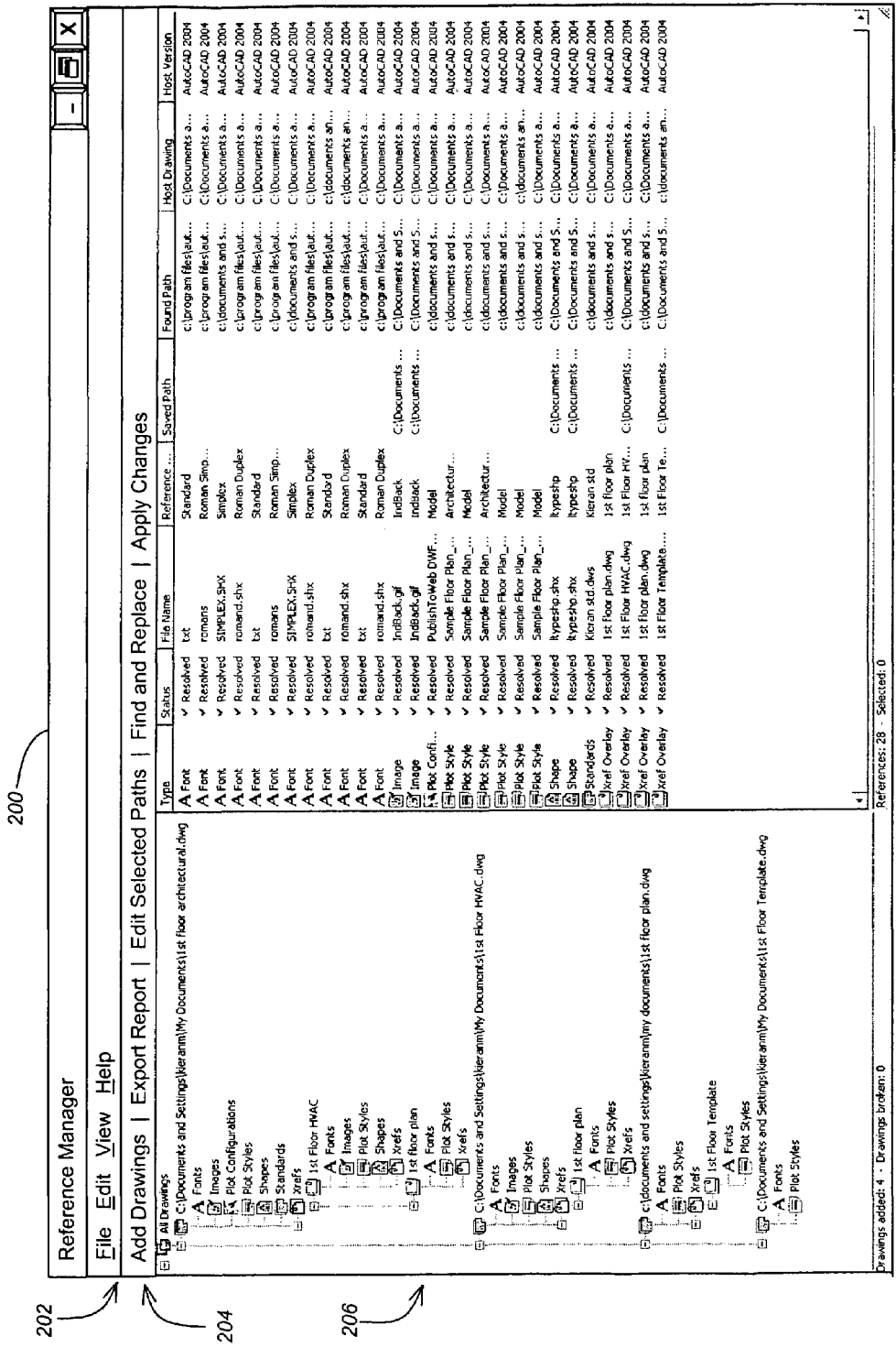
FIGS. 2A and 2B are each an illustration of a graphical user interface for a Reference Manager according to a preferred embodiment of the present invention.
Figure 2B:
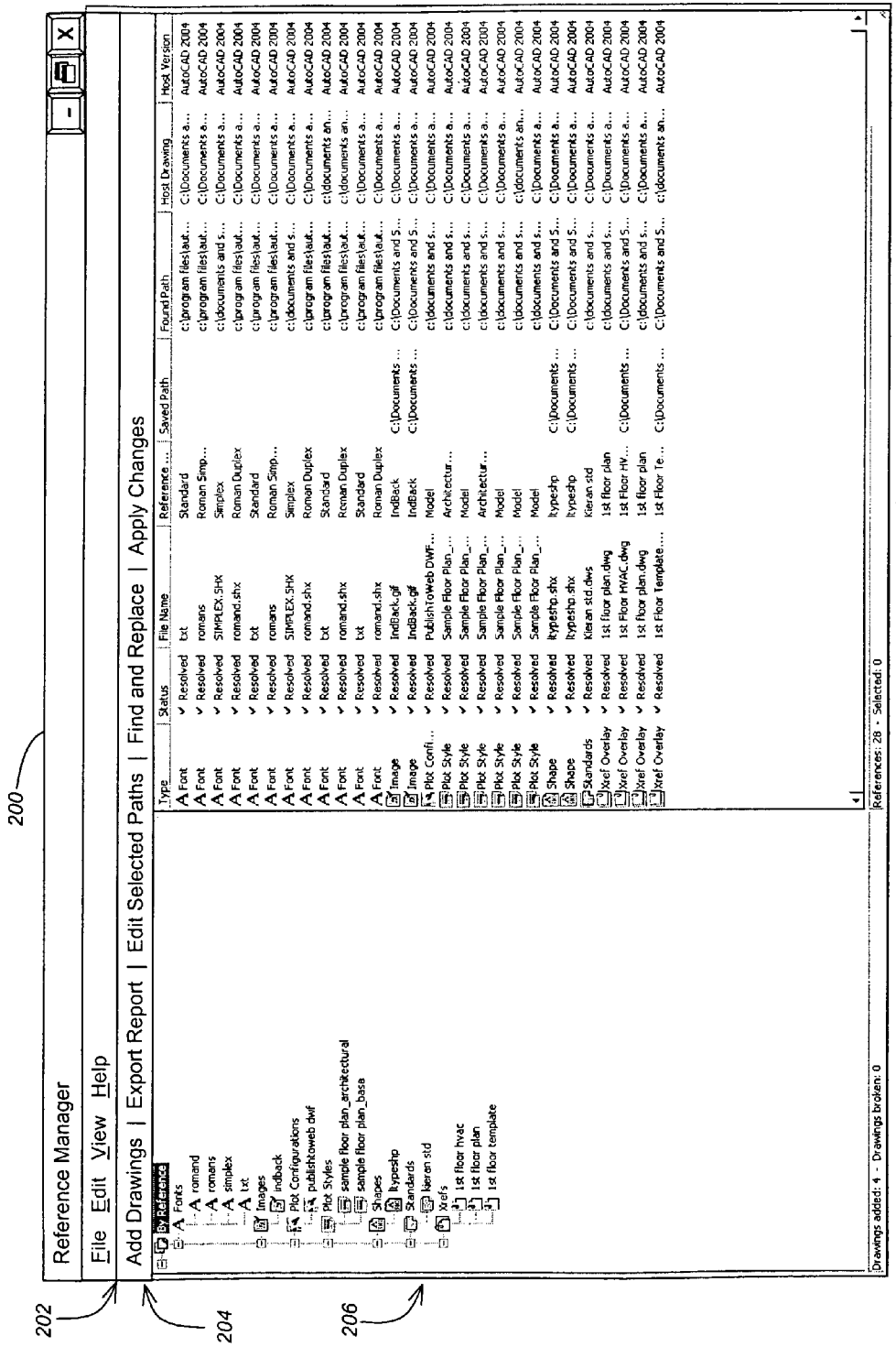

FIGS. 2A and 2B are each an illustration of a graphical user interface 200 for the Reference Manager 108 according to the preferred embodiment of the present invention. According to the preferred embodiment, the Reference Manager 108 is executed by the client computer 104 for the purposes of managing relationships between one or more host files 112 and one or more externally referenced files 112 contained within the host files 112, wherein the Reference Manager 108 includes a hierarchical tree view that describes hierarchical relationships among the host files 112 and the externally referenced files 112, and a list view that includes one or more columns describing attributes of the host files 112 and the externally referenced files 112. Generally, the files 112 are selected from a group comprising drawings, images, standards, fonts, shapes, plot styles and plot configurations. Generally, the Reference Manager 108 is useful to anyone who has to manage large numbers complex file relationships.

By attaching externally referenced files 112 to a host file 112, the user can:

Assemble a host file 112 from components comprising one or more externally referenced files 112 that may undergo changes as a project develops.

Coordinate their work with the work of others by including externally referenced files 112 into the host file 112 to keep up with the changes being made by other users.

Ensure that the most recent version of the externally referenced file 112 is displayed. When the user opens or plots their host file 112, each externally referenced file 112 is automatically reloaded, so that the host file 112 reflects the latest changes to the externally referenced files 112. After someone makes changes to the externally referenced files 112, and saves the changes, other users can access the changes immediately by reloading the externally referenced files 112 into the host file 112.

Display only a specific section of a drawing from an externally referenced file 112 in the host file 112 by creating clipped boundaries of the drawing.

The graphical user interface 200 includes one or more menus 202, one or more toolbars 204, a first pane 206 having a hierarchical tree view that describes hierarchical relationships among host files 112 and their externally referenced files 112, and a second pane 208 having a list view that includes one or more columns describing attributes of the host files 112 and/or externally referenced files 112.

The hierarchical tree view displays a hierarchical representation of the host file 112 and its associated externally referenced files 112, wherein a first level of the hierarchical tree view is a root node, a second level comprises one or more nodes representing host files 112 that are subordinate to the root node, and a third level comprises nodes subordinate to the host files 112 that represent the externally referenced files 112. Levels lower than the third level comprise further subordinate nodes, because there may be levels of nesting within the externally referenced files 112, wherein the externally referenced files 112 may themselves be host files 112 that include externally referenced files 112, and thus subordinate nodes themselves may have subordinate nodes. Consequently, the hierarchical tree view illustrates the various relationships of the host files 112 and/or externally referenced files 112.

In the hierarchical tree view, individual nodes are expandable (by selecting the "+" icon), as well as collapsible (by selecting the "−" icon), and open to reveal the various levels of nodes. Moreover, individual nodes may be selected using a cursor.

The list view accompanies the hierarchical tree view and is used to display specific details for files 112 selected in the hierarchical tree view. The list view displays an alphabetical list of the host files 112 and/or externally referenced files 112 for the selected nodes in the hierarchical tree view (or, as a default, all of nodes).

Each entry in the list view includes one or more of the following columns:

Type
Status
File Name
Reference Name
Saved Path
Found Path
Host Drawing
Host Version The Type column indicates whether the externally referenced file 112 is a drawing, image, standard, font, shape, plot style or plot configuration. Files 112 that are drawings are further identified as an Xref Attachment or Xref Overlay.

The Status column indicates the state of the externally referenced files 112 in the host file 112, wherein the following states appear in the Status column:

Resolved: Indicates that the externally referenced file 112 was found when the host file 112 was opened or reloaded.

Unloaded: Indicates that the externally referenced file 112 was unloaded by user.

Unreferenced: Indicates unreferenced nested externally referenced files 112. When an externally referenced file 112 with nested externally referenced files 112 is unloaded, not found, or unresolved, its nested externally referenced files 112 are unreferenced because the parent externally referenced file 112 is no longer present in the host file 112. If a parent externally referenced file 112 is unloaded, a message is displayed stating that its nested externally referenced files 112 are "orphaned."

Not found: Indicates that the externally referenced file 112 was not found when the host file 112 was opened or reloaded.

Unresolved: Indicates that the externally referenced file 112 was found, but could not be read.

The user can sort on the Status column to quickly group problem references for easy manipulation.

The File Name indicates the file 112 name of the externally referenced file 112.

The Reference Name indicates the reference name of the externally referenced file 112.

The Saved Path indicates the path and filed name where the file 112 is saved.

The Found Path indicates the found path and file name for the externally referenced file 112.

The Host Drawing indicates the path and file name of the host file 112.

The Host Version indicates the format of the host file 112.

The user can add multiple files 112 or even entire directories to the list of files 112 to be reported on in the Reference Manager 108. With any of the listed files 112 selected, the Reference Manager 108 displays detailed information about all dependencies for that file 112.

This hierarchical tree view combined with the list view provides two distinctly different methods for viewing the same information. In the first method illustrated in FIG. 2A, the Reference Manager 108 displays each host file 112 and all externally referenced files 112 used by the host file 112 down to a deepest level of nesting. Thus, the Reference Manager 108 provides a "who do I reference" method of displaying the information.

In the second method illustrated in FIG. 2B, the Reference Manager 108 displays a list of all of the externally referenced files 112 used by the host files 112, allows a user to select a particular one of the externally referenced files 112, and displays a list of all the host files 112 where that externally referenced file 112 is used. Thus, the Reference Manager 108 provides a "who references me" method of displaying the information.

If the user needs to correct unresolved paths, they can select multiple files 112 and correct their paths in a single operation by selecting the "Apply Changes" button. Because the Reference Manager 108 can operate on large numbers of files 112 on multiple computers 104, 106 at once, path changes are queued up and written back to the files 112 only when the user selects the "Apply Changes" button.

Figure 3:
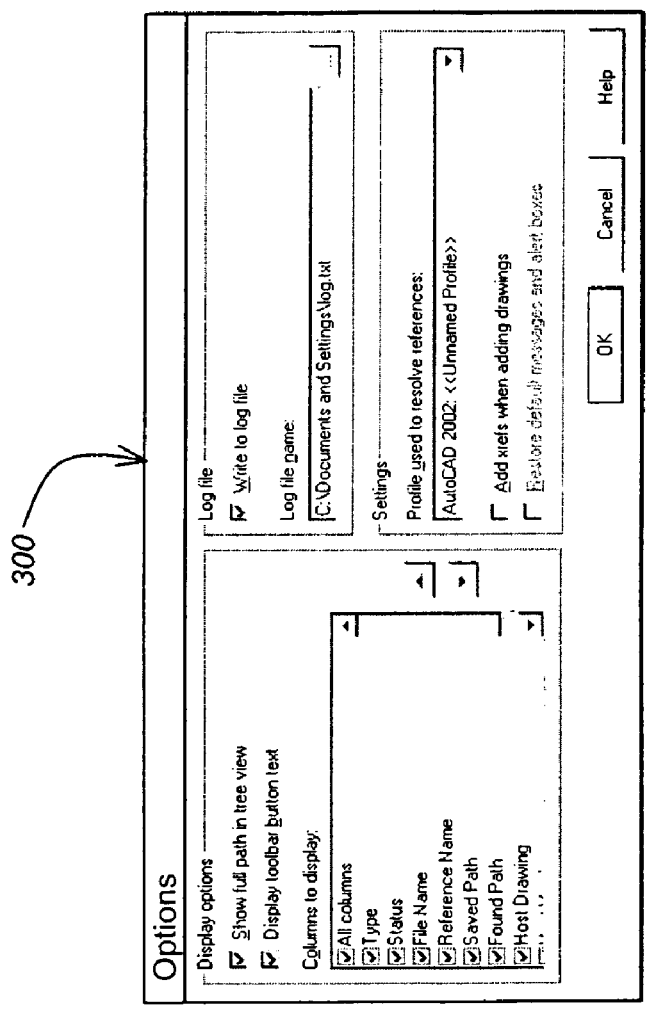
FIG. 3 is an illustration of an "Options" dialog for a Reference Manager according to a preferred embodiment of the present invention.

As shown in FIG. 3, under an "Options" dialog 300 selected from the File menu, the user can set the Reference Manager 108 to search for externally referenced files 112 based on a selected profile. The profiles set search paths, in order to identify where to look for externally referenced files 112 when locations are not explicitly defined.

Figure 4:
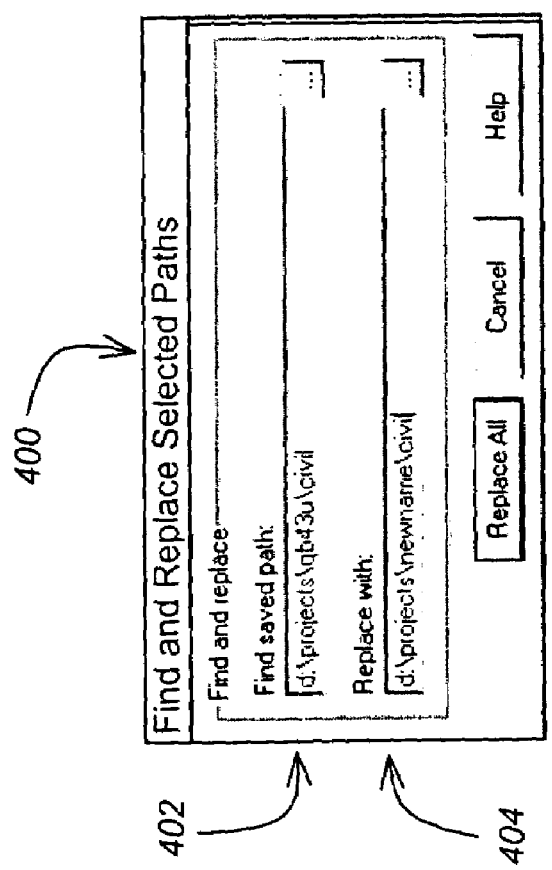
FIG. 4 is an illustration of an "Find and Replace" dialog for a Reference Manager according to a preferred embodiment of the present invention.

As shown in FIG. 4, the Reference Manager 108 includes a "Find and Replace" dialog 400 selected from the toolbar. This dialog 400 permits the user to find and replace path information for the externally referenced files 112. For example, if the user ever has to move project directories from one server 106 to another, or implement a new directory naming convention, the Reference Manager 108 makes updating the externally referenced files 112 a simple find-and-replace operation.

The "Find and Replace" dialog 400 is best used when the externally referenced files 112 use some of the same path information, but the folders or subfolders are varied. The user can select several externally referenced files 112 with varied paths and only the externally referenced files 112 that match the "Find Saved Path" field 402 are replaced.

For example, if the user selects the following paths:
d:\projects\qb43u\civil\Sample
d:\projects\qb43u\civil\Fonts
d:\projects\qb43u\civil\Support And, in the "Find Saved Path" field 402, the user enters:
d:\projects\qb43u\civil And, in the "Replace with" field 404, the user enters:
d:\projects\newname\civil Then, the result comprises the following paths:
d:\projects\newname\civil\sample
d:\projects\newname\civil\fonts
d:\projects\newname\civil\support Generally, the Reference Manager 108 keeps a log of all editing changes made, including the file name, original path, new path, and time and date of the editing change.

Object Structure

Figure 5:
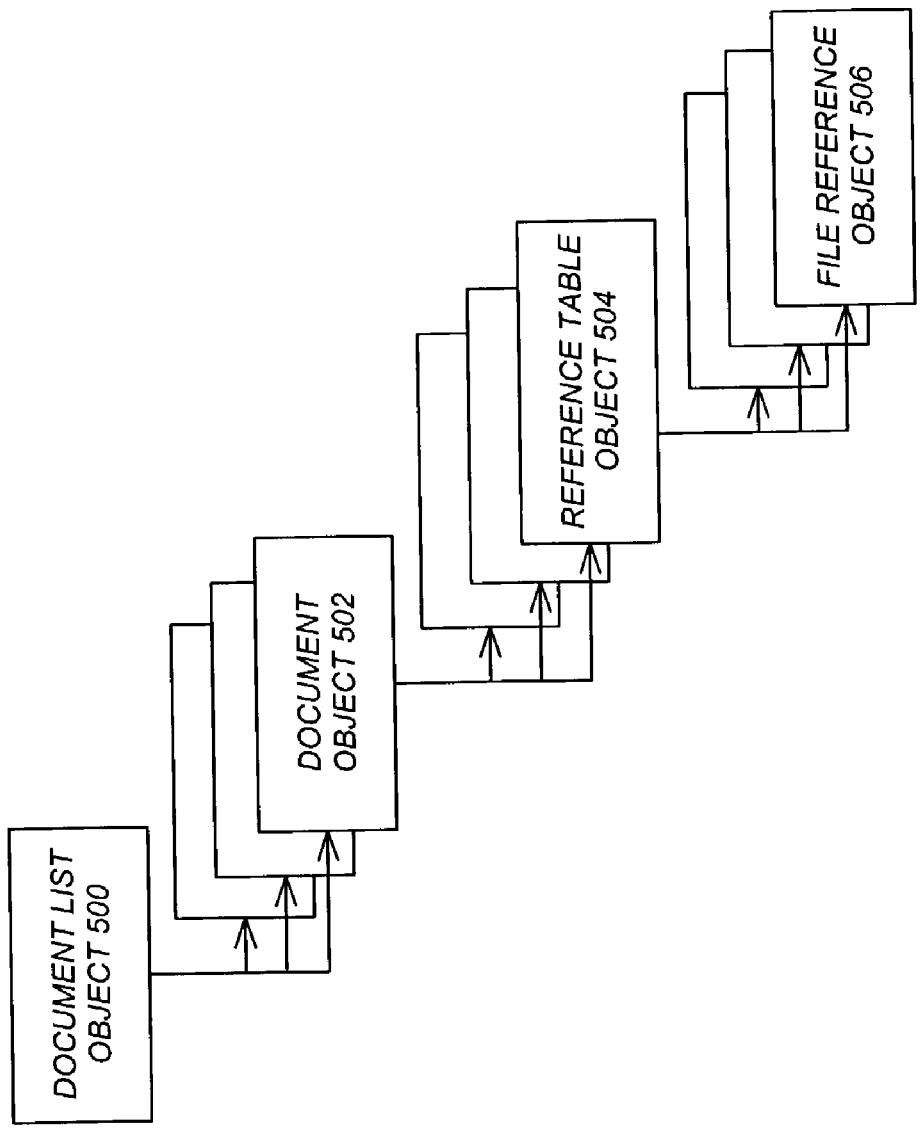
FIG. 5 illustrates an object structure used by a Reference Manager according to a preferred embodiment of the present invention.

FIG. 5 illustrates an object structure used by the Reference Manager 108 according to the preferred embodiment of the present invention. The Reference Manager 108 uses a container mechanism to store a list of host files 112, externally referenced files 112 and information about their relationships, wherein the container mechanism allows the host files 112 and the externally referenced files 112 to be displayed as a hierarchical tree view and a list view. This container mechanism includes logic and data that are based on a set of class specifications, which are instantiated as the following objects: a document list object 500, document object 502, reference table object 504 and file reference object 506. These objects are described in more detail below:

The container mechanism comprises an object hierarchy that includes the document list object 500 as a root object, and one or more document objects 502 subordinate to the document list object 500. The document list object 500 allows a list of host files 112 and externally referenced files 112 to be treated as a linear list or as a hierarchical tree. The document objects 502 each reads the contents of a file 112 in once and allows the file 112 to be accessed in various ways and from various points within the container mechanism.

Thus, the container mechanism is efficient, in that each file's contents are only read in once and stored only once in memory. At the same time, the mechanism is flexible, in that a given file can be accessed in various ways and from various points within the container.

For example, in most cases, reading five separate drawings that all have references to an externally referenced file 112 identified as "A.dwg" would result in reading "A.dwg" five separate times. The document object 502, on the other hand, reads "A.dwg" only once and then dynamically refers to "A.dwg" from various locations in the tree.

The Reference Manager 108 creates an iterator object to traverse the object hierarchy as the linear list or as the hierarchical tree. Using the iterator object, the Reference Manager 108 can traverse the list from end-to-end to examine the entire list of files 112, and at the same time, the Reference Manager 108 can also treat it as a hierarchical tree that provides information on externally referenced files 112 that are contained in a given host file 112, and also determine which externally referenced files 112 reference a specific host file 112.

In each use-case, the logic needed to use the container is similar, regardless of whether the Reference Manager 108 is traversing the list in a linear way, or treating it as a hierarchical tree and requesting the children of a node, or requesting the references to a given node. In each case, the Reference Manager 108 creates an iterator object for the type of traversal desired. Once the Reference Manager 108 has an iterator object, from that point forward, the logic is identical in each case, because the iterator object handles the work of supplying the Reference Manager 108 with the specific objects that are being accessed.

Each document object 502 corresponds to a single host file 112 or externally referenced file 112. Generally, a single document list object 500 is created for each host file 112 and one or more document objects 502 are added to the document list object 500 for each externally referenced file 112 for the host file 112.

Each of the document objects 502 includes one or more reference table objects 504 for each type of externally referenced file 112, i.e., drawings, images, standards, fonts, shapes, plot styles and plot configurations. The reference table object 504 manages a list of one or more file reference objects 506. Each of the file reference objects 506 contains information relating to a single externally referenced file 112. The file reference object 506 is used to "get" and "set" the filename associated with the given externally referenced file 112. It is also used to determine if the externally referenced file 112 can be successfully resolved and where the externally referenced file 112 resides if the given host file 112 is opened.

The reference table objects 504 and file reference objects 506 are instantiated from abstract base classes. These classes serve as the foundation for derived versions that are specialized for the specific types of reference data they hold. There are specialized derived versions of the classes used to instantiate the reference table objects 504 and file reference objects 504. For example, there is an font table class that derives from a reference table class. The font table class manages a list of font objects, which are a specialized form of the file reference class. In other words, the font table class is a specialized reference table class that is specifically meant, when instantiated as a reference table object 504, to hold font-related file reference objects 506. The specialized file reference class in this case is a font class.

The following table shows the specialized versions of the reference table and file reference classes.

| Derived from Reference Table Class | Derived from File Reference Class |
|---|---|
| Font Table | Font |
| Xref Table | Xref |
| Image Table | Image |
| Plot Configuration Table | Plot Configuration |
| Plot Style Table | Plot Style |
| Shape Table | Shape |
| Standard Table | Standard |

Object Operations

Figure 6:
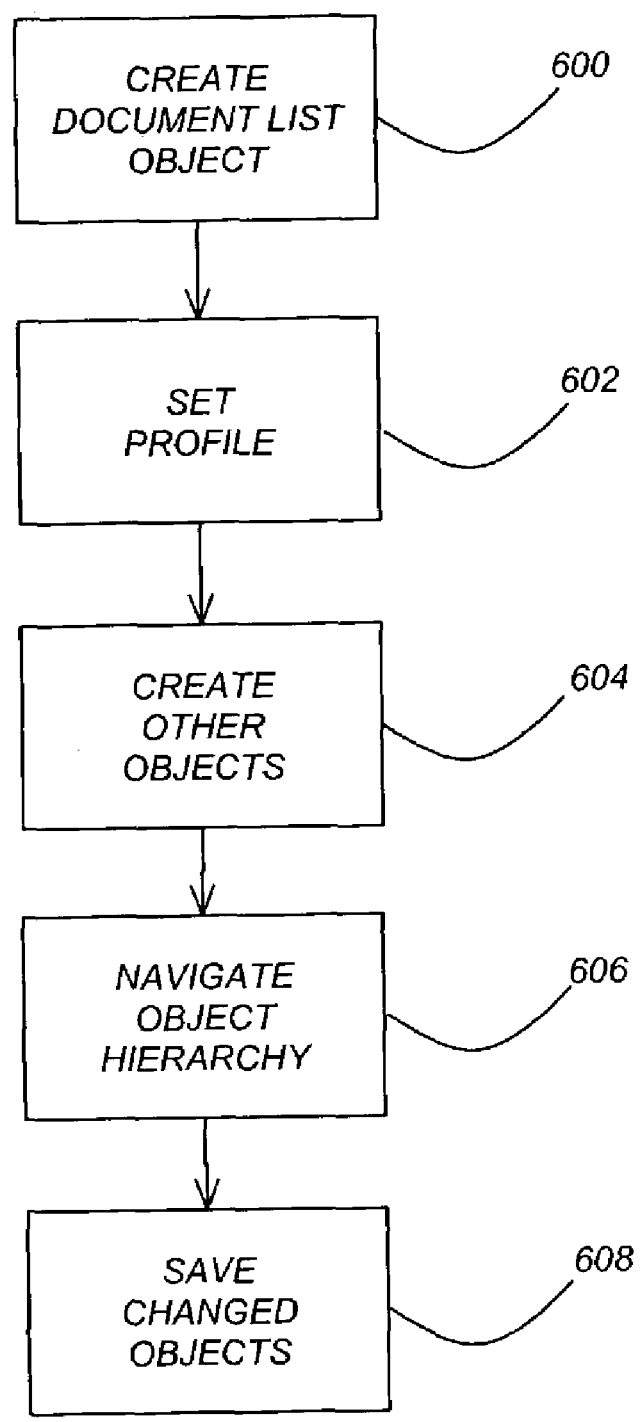
FIG. 6 is a flowchart illustrating the logic of a Reference Manager as it performs object operations according to a preferred embodiment of the present invention.

FIG. 6 is a flowchart illustrating the logic of the Reference Manager 108 as it performs the following operations using these objects, according to the preferred embodiment of the present invention:

Block 600 represents the Reference Manager 108 creating a document list object 500 for a host file 112.

Block 602 represents the Reference Manager 108 optionally setting the active profile by passing a registry key path string to the setProfile() member function, which allows the Reference Manager 108 to search for files 112 using the profile's search path.

Block 604 represents the Reference Manager 108 creating one or more document objects 502 for each externally referenced file 112 and adding them to the document list object 500 by calling the add() member function of the document list object 500. This step is repeated for each document object 502 added to the document list object 500. Moreover, this step also creates the reference table objects 504 and file reference objects 506.

Block 606 represents the Reference Manager 108 navigating the object hierarchy, through the document list object 500, document objects 502, and reference table objects 504, to locate the desired file reference objects 506.

Block 608 represents the Reference Manager 108 calling the saveChanges() member function on the document list object 500 to save any changes that may have been made.

All of the objects 500-506 derive from a common base class called Node. The Node class provides the base functionality that allows the Reference Manager 108 to navigate up and down the hierarchy of objects 500-506 as described in FIG. 6.

Navigating up the hierarchy is performed by calling a parent() member function. This function returns a pointer to the node that is the parent of the given node. For example, calling parent() on an reference table object 504 will return a pointer to the document object 502 that contains the table. Similarly; calling parent() on the document object 502 will return a pointer to the document list 500 (the root node).

Access to the children of a given node is provided via an iterator object known as an iterator object. The process of creating and using an iterator object is described below:

The Reference Manager 108 calls a function that creates an iterator object and returns a pointer to iterator object.

The Reference Manager 108 typically uses a 'for' or 'while' loop to step the iterator object until it has reached the end.

The Reference Manager 108 deletes the iterator object.

Each object has three member functions for creating three different types of iterator objects that provide access to the child nodes of a given node. They all follow the same basic steps outlined above and have similar usage but have slightly different behavior and results.

The first member function is the createChildIter() function. The createChildIter() function returns a pointer to an object that iterates the direct children of a given node. For example, if the Reference Manager 108 calls createChildIter() on the document list object 500, it will obtain an iterator object that traverses the document objects 502 that are contained in that document list object 500. Similarly, if the Reference Manager 108 calls createChildIter() on a document object 502, it will obtain an iterator object that traverses the reference table objects 504 contained in that object 502. If the Reference Manager 108 calls createChildIter() on a reference table object 504, it will obtain an iterator object that traverses the file reference objects 506 in that object 504.

The second type of iterator object can be obtained by calling createFileRefIter() on a given object. This iterator object can be used to provide easy direct access to all of the file reference objects 506 that fall under a given node, either directly or indirectly. For example, the Reference Manager 108 can obtain an iterator object that will traverse all of the file reference objects 506 in the entire hierarchy by calling createFileRefIter() on the document list object 500. That is, it will traverse all file reference objects 506 contained in all the reference table objects 504 in all of the document objects 502 within the given document list object 500. If the Reference Manager 108 calls createFileRefIter() on a specific document object 502, then it will obtain an iterator object that traverses all file reference objects 506 associated with that document object 502. Calling createFileRefIter() on an reference table object 504 produces the same result as calling createChildIter() on the same object 504, because the direct children of a reference table object 504 are file reference objects 506.

The third type of iterator object can be obtained by calling createNestedChildIter() on a given node. This iterator object allows the Reference Manager 108 to traverse objects a specified number of levels down the tree from a specified node. If the specified nesting level is 1, then this behaves exactly like createChildIter(). That is, only direct children will be traversed. If the nesting level is 2, then direct children and each of their direct children will be traversed. If the nesting level is <=0, then all children will be traversed.

Many of the iterator object creation functions use a parameter known as an "incExternal" flag. When true, this flag simply means that indirectly referenced objects can be traversed. The flag does not cause any additional files 112 to be read; instead, it only controls which of the objects already contained in the Reference Manager 108 will be traversed by the iterator object.

Consider an object A, which references an object B, which references an object C. If the Reference Manager 108 accesses object A, it will find that there is a block table record for object B and also one for object C. However, object C is not directly referenced by object A. It is only referenced as a by-product of being referenced by object B. If the Reference Manager 108 calls createNestedChildIter on object A with a false value for the incExternal parameter, then the Reference Manager 108 will only traverse objects that are directly referenced by object A. Thus, in this case, the Reference Manager 108 would not encounter an object representing C or anything that is not directly referenced in object A. On the other hand, if the Reference Manager 108 provided "true" for this parameter, the Reference Manager 108 would reference object C and anything that it references. Note that this example assumes that a document object 502 has been added to the document list object 500 for each of objects A, B, and C.

Conclusion

This concludes the description of the preferred embodiment of the invention. The following describes some alternative embodiments for accomplishing the present invention. For example, any type of computer or network configuration, such as a mainframe, minicomputer, personal computer, local area network, intranet or internet. Moreover, any type of application may utilize the invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for managing files, comprising:
    (a) a computer system; and
    (b) a reference manager, executed by the computer system, for managing relationships between one or more host files comprising drawings and one or more externally referenced files comprising images, standards, fonts, shapes, plot styles or plot configurations contained within the host files,
    (c) wherein the reference manager simultaneously displays both a hierarchical tree view that describes hierarchical relationships among the host files and the externally referenced files, and a list view that includes one or more columns describing attributes of the host files or the externally referenced files, and
    (d) wherein the reference manager displays in the hierarchical tree view a list of the externally referenced files a user selects a particular one of the externally referenced files, and displays in the list view a list of the host files where that externally referenced file is used.

2. The apparatus of claim 1, wherein a first level of the hierarchical tree view is a root node, a second level comprises one or more nodes subordinate to the root node, and a third level comprises nodes subordinate to the host files that represent the externally referenced files, each of which nodes represents one or more host files.

3. The apparatus of claim 1, wherein the columns are selected from a group comprising type, status, file name, reference name, saved path, found path, host drawing and host version.

4. The apparatus of claim 1, wherein the reference manager displays the host files and the externally referenced files used by the host files down to a deepest level of nesting.

5. The apparatus of claim 1, wherein the reference manager uses a container mechanism to store a list of host files, externally referenced files and information about their relationships.

6. The apparatus of claim 5, wherein the container mechanism allows the host files and the externally referenced files to be displayed as a hierarchical tree view and a list view.

7. The apparatus of claim 5, wherein the container mechanism comprises an object hierarchy that includes a root object and one or more document objects.

8. The apparatus of claim 7, wherein the root object allows a list of host files and externally referenced files to be treated as a linear list or as a hierarchical tree.

9. The apparatus of claim 8, wherein the reference manager creates an iterator object to traverse the object hierarchy as the linear list or as the hierarchical tree.

10. The apparatus of claim 7, wherein the document objects each reads the externally referenced file's contents in once and allow the file to be accessed in various ways and from various points within the container mechanism.

11. The apparatus of claim 7, wherein each of the document objects include a reference table for each type of externally referenced file contained in the host file represented by the document object.

12. The apparatus of claim 11, wherein the reference table manages a list of one or more file reference objects, and each of the file reference objects contains information relating to a single externally referenced file.

13. A computer-implemented method for managing files, comprising:
    (a) managing relationships between one or more host files comprising drawings and one or more externally referenced files comprising images, standards, fonts, shapes, plot styles or plot configurations contained within the host files in a reference manager executed by a computer system,
    (b) wherein the reference manager simultaneously displays both a hierarchical tree view that describes hierarchical relationships among the host files and the externally referenced files, and a list view that includes one or more columns describing attributes of the host files or the externally referenced files, and (c) wherein the reference manager displays in the hierarchical tree view a list of the externally referenced files a users selects a particular one of the externally referenced files, and displays in the list view a list of the host files where that externally referenced file is used.

14. The method of claim 13, wherein a first level of the hierarchical tree view is a root node, a second level comprises one or more nodes subordinate to the root node, and a third level comprises nodes subordinate to the host files that represent the externally referenced files, each of which nodes represents one or more host files.

15. The method of claim 13, wherein the columns are selected from a group comprising type, status, file name, reference name, saved path, found path, host drawing and host version.

16. The method of claim 13, wherein the reference manager displays the host files and the externally referenced files used by the host files down to a deepest level of nesting.

17. The method of claim 13, wherein the reference manager uses a container mechanism to store a list of host files, externally referenced files and information about their relationships.

18. The method of claim 17, wherein the container mechanism allows the host files and the externally referenced files to be displayed as a hierarchical tree view and a list view.

19. The method of claim 17, wherein the container mechanism comprises an object hierarchy that includes a root object and one or more document objects.

20. The method of claim 19, wherein the root object allows a list of host files and externally referenced files to be treated as a linear list or as a hierarchical tree.

21. The method of claim 20, wherein the reference manager creates an iterator object to traverse the object hierarchy as the linear list or as the hierarchical tree.

22. The method of claim 19, wherein the document objects each reads the externally referenced file's contents in once and allow the file to be accessed in various ways and from various points within the container mechanism.

23. The method of claim 19, wherein each of the document objects include a reference table for each type of externally referenced file contained in the host file represented by the document object.

24. The method of claim 23, wherein the reference table manages a list of one or more file reference objects, and each of the file reference objects contains information relating to a single externally referenced file.

25. An article of manufacture stored in a data storage device embodying instructions for a computer-implemented method for managing files, the method comprising:

(a) managing relationships between one or more host files comprising drawings and one or more externally referenced files comprising images, standards, fonts, shapes, plot styles or plot configurations contained within the host flies in a reference manager executed by a computer system, (b) wherein the reference manager simultaneously displays both a hierarchical tree view that describes hierarchical relationships among the host files and the externally referenced files, and a list view that includes one or more columns describing attributes of the host files or the externally referenced files, and (c) wherein the reference manager displays in the hierarchical tree view a list of the externally referenced files, a user selects a particular one of the externally referenced files, and displays in the list view a list of the host files where that externally referenced file is used.

26. The article of manufacture of claim 25, wherein a first level of the hierarchical tree view is a root node, a second level comprises one or more nodes subordinate to the root node, and a third level comprises nodes subordinate to the host files that represent the externally referenced files, each of which nodes represents one or more host files.

27. The article of manufacture of claim 25, wherein the columns are selected from a group comprising type, status, file name, reference name, saved path, found path, host drawing and host version.

28. The article of manufacture of claim 25, wherein the reference manager displays the host files and the externally referenced files used by the host files down to a deepest level of nesting.

29. The article of manufacture of claim 25, wherein the reference manager uses a container mechanism to store a list of host files, externally referenced files and information about their relationships.

30. The article of manufacture of claim 29, wherein the container mechanism allows the host files and the externally referenced files to be displayed as a hierarchical tree view and a list view.

31. The article of manufacture of claim 29, wherein the container mechanism comprises an object hierarchy that includes a root object and one or more document objects.

32. The article of manufacture of claim 31, wherein the root object allows a list of host files and externally referenced files to be treated as a linear list or as a hierarchical tree.

33. The article of manufacture of claim 32, wherein the reference manager creates an iterator object to traverse the object hierarchy as the linear list or as the hierarchical tree.

34. The article of manufacture of claim 31, wherein the document objects each reads the externally referenced file's contents in once and allow the file to be accessed in various ways and from various points within the container mechanism.

35. The article of manufacture of claim 31, wherein each of the document objects include a reference table for each type of externally referenced file contained in the host file represented by the document object.

36. The article of manufacture of claim 35, wherein the reference table manages a list of one or more file reference objects, and each of the file reference objects contains information relating to a single externally referenced file.

* * * * *